(12) United States Patent
Sweetland

(10) Patent No.: US 11,602,891 B2
(45) Date of Patent: Mar. 14, 2023

(54) DEFECT MITIGATION FOR RECOATING SYSTEMS FOR ADDITIVE MANUFACTURING

(71) Applicant: VulcanForms Inc., Burlington, MA (US)

(72) Inventor: Matthew Sweetland, Bedford, MA (US)

(73) Assignee: VulcanForms Inc., Burlington, MA (US)

(*) Notice: Subject to any disclaimer, the term of this patent is extended or adjusted under 35 U.S.C. 154(b) by 0 days.

(21) Appl. No.: 17/461,077

(22) Filed: Aug. 30, 2021

(65) Prior Publication Data

US 2022/0072769 A1 Mar. 10, 2022

Related U.S. Application Data

(60) Provisional application No. 63/074,752, filed on Sep. 4, 2020.

(51) Int. Cl.
*B29C 64/218* (2017.01)
*B29C 64/153* (2017.01)
(Continued)

(52) U.S. Cl.
CPC .......... *B29C 64/153* (2017.08); *B29C 64/214* (2017.08); *B29C 64/218* (2017.08);
(Continued)

(58) Field of Classification Search
CPC ............................... B29C 64/218; B22F 12/63
See application file for complete search history.

(56) References Cited

U.S. PATENT DOCUMENTS

| | | | |
|---|---|---|---|
| 5,626,919 A | | 5/1997 | Chapman et al. |
| 5,902,537 A | * | 5/1999 | Almquist ................ B29C 41/12 264/401 |

(Continued)

FOREIGN PATENT DOCUMENTS

| | | |
|---|---|---|
| EP | 3 466 566 A1 | 4/2019 |
| WO | WO 2017/143145 A1 | 8/2017 |

OTHER PUBLICATIONS

International Search Report and Written Opinion dated Jan. 6, 2022 in connection with International Application No. PCT/US21/48217.

*Primary Examiner* — Timothy Kennedy
(74) *Attorney, Agent, or Firm* — Wolf, Greenfield & Sacks, P.C.

(57) ABSTRACT

Disclosed embodiments relate to recoater systems for use with additive manufacturing systems. A recoater assembly may be used to deposit a material layer onto a build surface of an additive manufacturing system. In some instances, the recoater assembly may include a powder entrainment system that trails behind a recoater blade of the recoater assembly relative to a direction of motion of the recoater blade across a build surface of the additive manufacturing system. The powder entrainment system may generate a flow of fluid across a portion of the build surface behind the recoater blade that at least temporarily entrains powder above a threshold height from the build surface to mitigate, or prevent, the formation of defects on the build surface with heights greater than the threshold height.

23 Claims, 10 Drawing Sheets

(51) Int. Cl.
*B29C 64/214* (2017.01)
*B29C 64/236* (2017.01)
*B29C 64/232* (2017.01)
*B33Y 40/00* (2020.01)
*B29C 64/35* (2017.01)
*B29C 64/364* (2017.01)
*B33Y 10/00* (2015.01)
*B33Y 30/00* (2015.01)
*B29C 64/286* (2017.01)

(52) U.S. Cl.
CPC .......... *B29C 64/232* (2017.08); *B29C 64/236* (2017.08); *B29C 64/286* (2017.08); *B29C 64/35* (2017.08); *B29C 64/364* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 6,764,636 B1 * | 7/2004 | Allanic | B29C 64/214 118/100 |
| 9,956,612 B1 | 5/2018 | Redding et al. | |
| 10,022,795 B1 | 7/2018 | Redding et al. | |
| 10,207,326 B2 * | 2/2019 | Park | B22F 10/10 |
| 10,449,718 B1 | 10/2019 | Stroud et al. | |
| 11,192,302 B2 * | 12/2021 | Rademacher | B29C 64/35 |
| 2002/0195749 A1 | 12/2002 | Zellers et al. | |
| 2016/0158889 A1 | 6/2016 | Carter et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2017/0326792 A1 * | 11/2017 | Paternoster | B22F 12/00 |
| 2018/0200792 A1 | 7/2018 | Redding et al. | |
| 2018/0207722 A1 | 7/2018 | Feldmann et al. | |
| 2018/0207872 A1 * | 7/2018 | Klein | B22F 12/63 |
| 2018/0215079 A1 * | 8/2018 | Hakkaku | B29C 33/442 |
| 2018/0236549 A1 | 8/2018 | Spears et al. | |
| 2018/0272604 A1 | 9/2018 | Welch | |
| 2019/0143406 A1 | 5/2019 | Carter et al. | |
| 2019/0207872 A1 | 7/2019 | Hallivuori | |
| 2019/0232369 A1 | 8/2019 | Strössner et al. | |
| 2019/0299286 A1 | 10/2019 | Feldmann et al. | |
| 2020/0039000 A1 | 2/2020 | Sweetland | |
| 2020/0108465 A1 | 4/2020 | Sweetland | |
| 2020/0376762 A1 | 12/2020 | Sweetland | |

* cited by examiner

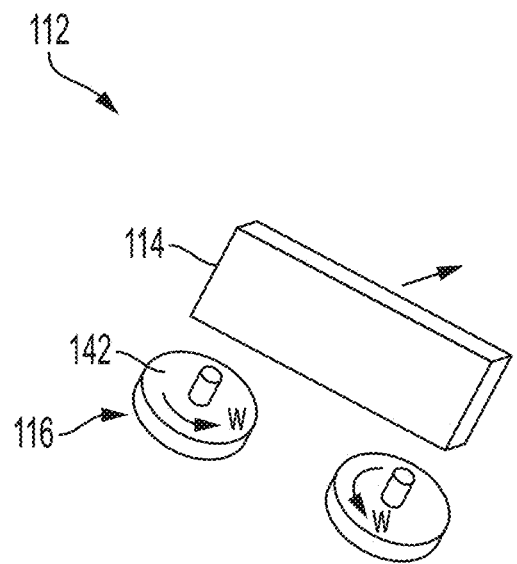
FIG. 14
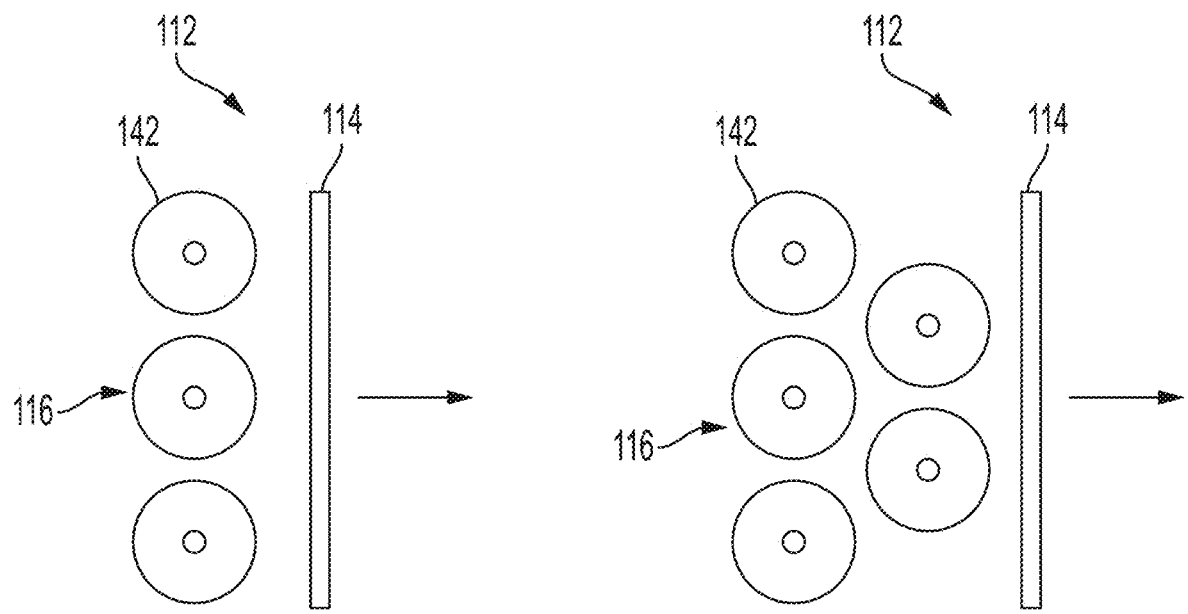
FIG. 15
FIG. 16

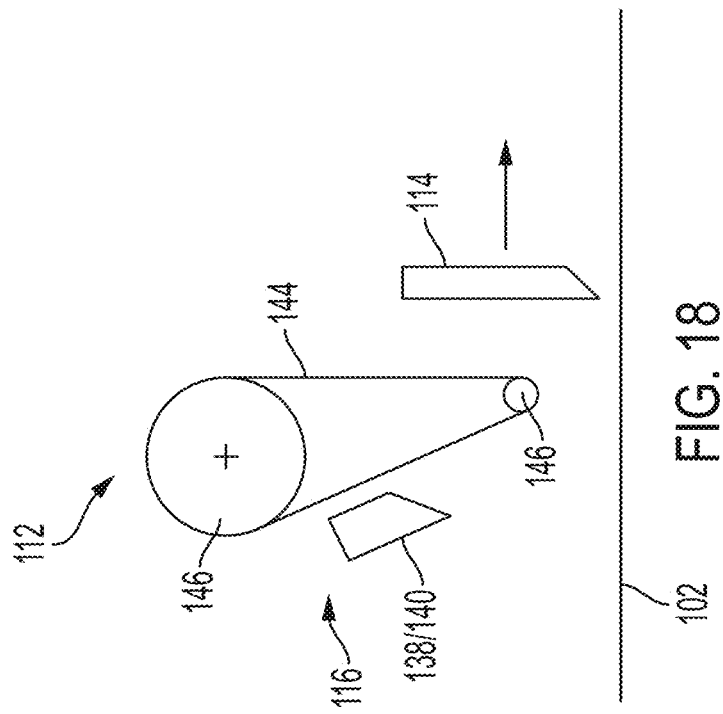
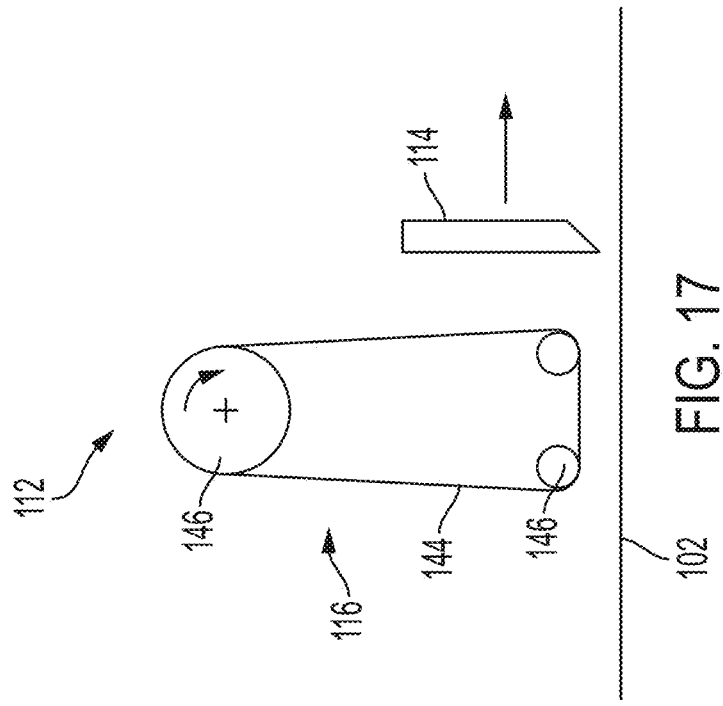

DEFECT MITIGATION FOR RECOATING SYSTEMS FOR ADDITIVE MANUFACTURING

CROSS-REFERENCE TO RELATED APPLICATIONS

This application claims the benefit of priority under 35 U.S.C. § 119(e) of U.S. Provisional Application Ser. No. 63/074,752, filed Sep. 4, 2020, the disclosure of which is incorporated herein by reference in its entirety.

FIELD

Disclosed embodiments are related to defect mitigation for recoating systems for additive manufacturing.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a three-dimensional object.

Some additive manufacturing systems may include a system for depositing and/or spreading a precursor material onto a build surface. For example, in powder bed fusion systems, a recoater assembly may be used to deposit a layer of powder onto the build surface. A recoater assembly may include a recoater blade connected to a recoater support structure, which may be controlled so as to drag the recoater blade across the build surface, smoothing the deposited powder to provide a layer of uniform thickness.

SUMMARY

In one embodiment, a recoater assembly for an additive manufacturing system includes a recoater blade and a powder entrainment system. The powder entrainment system may be configured to generate a flow of fluid, such as a gas, across a portion of the build surface with a velocity profile that increases from the build surface towards the powder entrainment system. Additionally, in some optional embodiments, the powder entrainment system may also be configured to trail behind the recoater blade relative to a direction of travel of the recoater blade across the build surface such that the powder entrainment system generates the flow of fluid behind the recoater blade relative to the direction of travel.

In one embodiment, a recoater assembly for an additive manufacturing system includes a recoater blade and a powder entrainment system. The powder entrainment system may be configured to trail behind the recoater blade relative to a direction of motion of the recoater blade across a build surface of the additive manufacturing system. The powder entrainment system may also include a moveable surface that is configured to move relative to a proximate portion of the build surface at a first velocity that is different from a second velocity of the recoater blade relative to the build surface. The first velocity is between or equal to 0.1 meters per second (m/s) and 2.0 m/s, and at least a portion of the moveable surface is disposed at a height from the build surface that is between or equal to 0.5 millimeters (mm) and 10.0 mm.

In one embodiment, a method of recoating a build surface of an additive manufacturing system includes: depositing powder onto the build surface with a recoater assembly; and flowing a fluid across at least a portion of the build surface with a velocity profile that increases with increasing distance from the build surface such that powder above a threshold height from the build surface becomes entrained in the flow of fluid. Optionally, in some embodiments, flowing the fluid across the build surface includes flowing the fluid across the build surface behind a path of travel of the recoater blade.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 14 is a schematic perspective view of one embodiment of a recoater assembly including a plurality of rotating disks;

FIG. 15 is a schematic top view of one embodiment of a recoater assembly including a plurality of rotating disks arranged in a linear array;

FIG. 16 is a schematic top view of one embodiment of a recoater assembly including a plurality of rotating disks arranged in a staggered array;

FIG. 17 is a schematic cross-sectional view of a recoater assembly including a belt according to one embodiment; and FIG. 18 is a schematic cross-sectional view of a recoater assembly including a belt and a vacuum port.

DETAILED DESCRIPTION

Figure 1A:
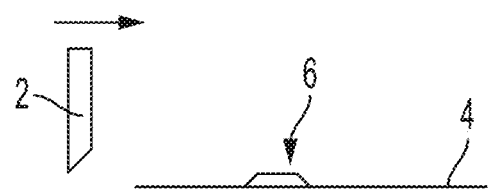
FIGS. 1A-1E depict a schematic cross-sectional view of one embodiment of a defect growing in size during the deposition and fusion of subsequent layers during an additive manufacturing process.
Figure 1B:
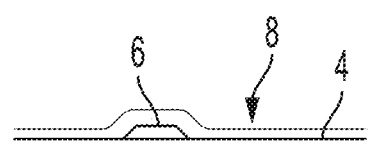
Figure 1C:
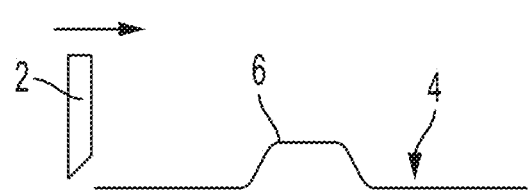
Figure 1D:
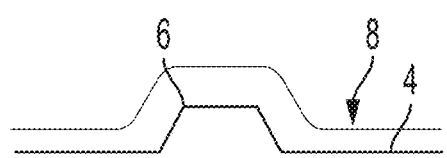
Figure 1E:

During a recoating process, a quantity of powder is deposited on one end of a build surface and then a recoater blade is pulled across the surface at a set height above the previous build layer. As the blade is pulled across the surface, the powder is pushed in front of the blade and only a thin layer of the powder is left behind after the blade passes. The thickness of this layer is set by the height of the blade above the previously processed layer and may be in the range of about 20 micrometers (μm) to 500 μm thick. However, the Inventors have recognized that one of the issues with using a solid blade recoating system is the interaction between the previously printed layer and the recoater blade. In some cases, defects formed in a previously printed layer may protrude up past the top of the nominal print height. If these defects extend up far enough, the defects may contact the recoater blade as it travels across the next build plane. This contact between the recoater blade and defects on a build surface may have different effects on the recoating process and subsequent build layers including, but not limited to: layer deformation, delamination and/or deformation of the printed part; pulling a printed part completely off a build plate; permanent damage to the recoater blade such as a nick or cut in the blade; an upward shifting of the entire blade to clear the defect; vibration of the recoater blade after passing the defect; and/or any other number of different types of effects that may occur due to the interaction of a recoater blade with a defect on a build surface. Depending on whether the recoater blade is made from a polymer or rubber material versus a harder metallic or ceramic blade, different effects may be more or less prevalent. For example, a polymer or rubber recoater blades may be at less risk of catastrophic damage or delamination of the previously printed part, but there is a much greater risk of damage such as cuts and nicks to the recoater blade which may cause uneven tracks in the recoated surface. Machine designs are possible that allow for easy or automatic exchange of recoater blades when interference contact damage to the blade is detected. However, if the interference contact is still present, the new blade may also be damaged.

While interference contact between a previously printed material and a recoater blade will not always cause a problem with subsequent printed layers, the Inventors have recognized that in some cases an initial minor defect may cause a negative feedback where the defect grows in size over multiple subsequently deposited and fused layers such that a size of the growing defect may lead to large scale damage to the recoater or even failure of the entire print process. This type of negative feedback where each subsequent layer after an initial contact with a defect produces a larger defect and corresponding increased contact with the recoater blade can cause complete process failure. Alternatively, this negative feedback can cause a part failure after the part is complete. For example, if a layer of powder over a point is sufficiently thick compared to the nominal recoating thickness, when the point is processed, there may not be sufficient laser power to fully melt the layer in a solid weld to the previous layer. This weak point in the part can delaminate during the part lifetime causing complete part failure under load. Also this weak point may delaminate many layers later during the print process causing large scale deformation of the part and a complete print failure. This type of failure can also be very hard to troubleshoot as the cause of the delamination and part failure may be hundreds of layers separated from the actual failure point.

In view of the above, the Inventors have recognized the need for a method to mitigate or reduce the likelihood of defects in a build surface growing in size during the formation of subsequent layers of a part. Accordingly, in some embodiments, a movable surface following behind a path of travel of a recoater blade, or moved over the build surface in a separate process, may induce a flow of fluid over the build surface by generating a boundary layer of the fluid on the movable surface. Based on the type of powder (particle mass, particle density, particle size, etc.), there is a minimum velocity before a moving fluid with a given density will start to have any effect on the powder. Below this velocity, the powder surface will not be substantially affected. Above this velocity, the moving fluid will start to entrain and move the powder. By positioning the movable surface a fixed height above the nominal new powder level height, the established boundary layer thickness can be set such that it has little to substantially no effect on powder that is at or below the nominal layer thickness. However, areas of powder that extend above the nominal layer thickness may start to protrude into the boundary layer of flowing fluid over the build surface. Powder that extends far enough into the boundary layer above a threshold height above the build surface may be subject to a fluid flow velocity that is at or above a minimum entrainment velocity of the powder particles. At this point, the boundary layer may entrain at least a portion, and in some instances substantially all, of the powder extending above the threshold height such that the entrained powder is removed from the build surface at the defect location. This may reduce the excess powder layer thickness at the defect location. While some of the entrained powder may remain in the entrained boundary layer, another portion of the powder may be ejected from the boundary layer due to centripetal forces. Depending on how the flow of fluid is handled, the entrained powder may either be removed from the system using a system such as a filter or vacuum and/or the released powder may be spread evenly over a much larger area than the initial area of excess powder thickness. In either case, this may drastically reduce the trend towards a negative feedback loop resulting in a defect growing in size in any given spot or area during subsequent layer formation.

In view of the above, in one embodiment, a powder may be deposited onto the build surface of a recoater assembly with a desired nominal layer thickness using a recoater assembly. In some instances, this may include passing a recoater blade over the build surface to distribute the powder across the build surface. A fluid may be flowed across at least a portion of the build surface, which may be behind a path of travel of the recoater blade across the build surface in some embodiments. The flow of fluid may have a velocity profile that increases with increasing distance from the build surface such that powder deposited onto the build surface above a threshold height from the build surface may become entrained in the flow of fluid. For example, in some embodiments, the recoater assembly may include a powder entrainment system with a movable surface that may move relative to the underlying portion of the build surface. In instances where the powder entrainment system moves behind a path of travel of a recoater blade of the system, the moveable surface may move with a velocity relative to the build surface that is different from a velocity of the recoater blade relative to the build surface. In either case, the velocity of the movable surface relative to the underlying portion of the build surface may be sufficient to generate a boundary layer of the fluid to provide the desired velocity profile of the flow of fluid to entrain particles of the powder located above the threshold height.

The methods and systems described herein may help to reduce the presence of excess powder over discrete areas as well as over tracks that extend along the length and/or width of a powder layer deposited onto a build surface of an additive manufacturing system. While in some embodiments excess powder may still be present on the surface, the excess powder may be distributed over a much larger area and the maximum thickness at any one point extending above the nominal thickness of a layer may be significantly reduced. This reduction in peak areas may help to prevent the occurrence of a negative feedback loop resulting in defects on a build surface growing in size during the deposition of subsequently deposited layers of material during a build process. This may result in both increased part quality and fidelity as well as increased operational lifetimes for components such as the recoater blade of an additive manufacturing system. Additionally, without wishing to be bound by theory, the larger the thickness of the initial excess powder height, the more effective the disclosed methods and systems become as the larger the thickness, the more the powder will extend into the induced boundary flow where the higher local gas velocity may result in increased entrainment of the excess powder. Thus, the disclosed systems become even more effective as the size of a defect and excess amounts of powder increase. However, embodiments in which the above-noted benefits are not present and/or in which different benefits are present in an additive manufacturing system implementing the methods and/or systems disclosed herein are also possible as the disclosure is not limited in this fashion.

It should be understood that the methods and systems described herein may use any appropriate type of movable surface for generating a desired boundary layer to provide a flow of fluid with a desired velocity profile across at least a portion of a build surface of an additive manufacturing system. For example, in some embodiments, a powder entrainment system may include a rotatable roller with at least a portion of a surface of the roller, e.g. the portion of the roller surface oriented towards the build surface, disposed at a predetermined height above the build surface of an additive manufacturing system. Additionally, in some embodiments, an axis of rotation of the rotatable roller is parallel to the build surface. In another embodiment, the powder entrainment system may include a belt that includes a portion of the belt with a surface that is oriented towards the build surface and that is disposed at a predetermined height above the build surface of an additive manufacturing system. Accordingly, the belt may be operated such that the portion of the belt oriented towards and located proximate to the build surface may be moved relative to the build surface to generate a desired flow of fluid across the build surface. In yet another embodiment, a powder entrainment system may include a plurality of rotatable disks located at a predetermined height above the build surface of an additive manufacturing system. In some instances, each rotatable disc may have an axis of rotation that is angled relative to the underlying build surface (e.g. orthogonal to the build surface). Accordingly, it should be understood that any appropriate component capable of being moved relative to an underlying build surface to generate a boundary layer of fluid with a desired velocity profile to provide the desired flow of fluid across an adjacent portion of the build surface may be used as the disclosure is not so limited. Additionally, depending on the specific embodiment, a movable surface proximate to the build surface used to generate the boundary layer of flowing fluid may either move in the same direction as a direction of motion of the overall powder entrainment system, a direction that is opposite the direction of motion of the powder entrainment system, and/or any other appropriate direction as the disclosure is not so limited.

As noted above, a minimum velocity of a fluid for entraining the particles of a powder deposited onto a build surface may depend on various parameters such as the particle mass, particle density, particle size, fluid density, and/or any other appropriate parameter. That said, in some embodiments, a minimum velocity for entraining the particles of a powder in a flow of fluid, which may also correspond to a threshold velocity of a fluid flow at a threshold height from a build surface of an additive manufacturing system, may be greater than or equal to 0.1 meters per second (m/s), 0.2 m/s, 0.3 m/s, 0.4 m/s, 0.5 m/s, 1 m/s, 1.5 m/s, and/or any other appropriate velocity. Correspondingly, the minimum entrainment velocity and/or threshold velocity of the flow of fluid may be less than or equal to 2.0 m/s, 1.5 m/s, 1 m/s, 0.5 m/s, 0.4 m/s, 0.3 m/s, and/or any other appropriate velocity. Combinations of the foregoing ranges are contemplated including, for example, a minimum entrainment velocity and/or threshold velocity of a flow of fluid for a given type of powder may be between or equal to 0.1 m/s and 2.0 m/s. However, other combinations of the above ranges and/or velocities both greater than and less than those noted above are also contemplated as the disclosure is not so limited. Additionally, the velocity of a fluid flow at different heights between a moving surface and a build surface may be measured in any appropriate manner including flow visualization methods; velocitometers; calculations and/or finite element analysis techniques based on the measured parameters of the fluid and the operating parameters of the moveable surface for determining the boundary flow between the moveable surface and build surface; hot wire anemometers; ultrasonic flow sensors, and/or any other appropriate method.

To facilitate dispersing and/or removing powder particles located on a build surface that extend above a threshold height above the build surface, a powder entrainment system may be configured to provide flow of fluid with a velocity profile that is greater than or equal to a threshold velocity, such as a minimum entrainment velocity of the powder, at heights equal to or greater than the threshold height above the build surface in a direction parallel to a direction of gravity. The threshold height may be dependent on the nominal thickness of a corresponding powder layer and permitted layer thickness tolerances deposited on a build surface. Specifically, the build surface may correspond to a previously processed layer, a surface of a build plate, and/or any other appropriate surface that a powder layer to be processed is deposited on. Thus, the threshold height may be measured either from this build surface and/or from a nominal height of a powder layer deposited onto the build surface. In either case, in some embodiments, the threshold height above a build surface may be greater than or equal to 25 µm, 30 µm, 40 µm 50 µm, 100 µm, 200 µm, and/or any other appropriate height above the build surface. Correspondingly, the threshold height may be less than or equal to 500 µm, 400 µm, 300 µm, 200 µm, 100 µm, 50 µm, 20 µm, and/or any other appropriate height above the build surface. Combinations of the foregoing ranges are contemplated including, for example, a threshold height that is between or equal to 5 µm and 500 µm above the build surface may be used. Alternatively, the threshold height may be measured from the nominal height of a powder layer deposited onto the build surface. In such an embodiment, the threshold height may be located at a height that is greater than or equal to 5 µm, 10 µm, 20 µm, 30 µm, 40 µm, 50 µm, 100 µm, and/or any other appropriate height above the nominal height of the powder layer disposed on the build surface. Correspondingly, the threshold height may be located at a height that is less than or equal to 100 µm, 50 µm, 40 µm, 30 µm, 20 µm, 10 µm, and/or any other appropriate height above the nominal height of the powder layer disposed on the build surface. Combinations of the foregoing are contemplated including, for example, a threshold height that is located at a height that is between or equal to 5 µm and 100 µm above the nominal height of a layer of powder disposed on a build surface. Of course, depending on the specific layer thickness and permitted tolerances, threshold heights both greater than and less than those noted above are contemplated as the disclosure is not limited in this fashion.

It should be understood that any appropriate thickness of a powder layer may be used depending on the particular application. For example, appropriate thicknesses of powder layers sequentially deposited onto a build surface may be greater than or equal to 20 µm, 30 µm, 40 µm, 50 µm, 100 µm, 200 µm, 300 µm, and/or any other appropriate thickness. Correspondingly, the thickness of the sequentially deposited powder layers may be less than or equal to 500 µm, 400 µm, 300 µm, 200 µm, 100 µm, 50 µm, and/or any other appropriate thickness. Combinations of the foregoing are contemplated including, for example, a thickness of a powder layer deposited onto a build surface that is between or equal to 20 µm and 500 µm. Of course thicknesses of a powder layer both greater than and less than those noted above are also contemplated as the disclosure is not so limited.

In addition to the above, a portion of a movable surface that is oriented towards a build surface and used to generate the desired flow of fluid may be disposed within a predetermined height of the build surface. This may also be referred to as an offset between the build surface and the portion of the movable surface oriented towards the build surface. For example, a portion of the movable surface that is oriented towards a build surface and used to generate a flow of fluid parallel to the build surface may be disposed at a height from the build surface that is greater than or equal to 0.5 millimeters (mm), 1.0 mm, 2.0 mm, 3.0 mm, 4.0 mm, 5.0 mm, and/or any other appropriate height. Correspondingly, the noted height may be less than or equal to 10.0 mm, 9.0 mm, 8.0 mm, 7.0 mm, 6.0 mm, and/or any other appropriate height. Combinations of the foregoing ranges are contemplated including, for example, a portion of a movable surface that is oriented towards the build surface may be located at a height over the underlying build surface that is between or equal to 0.5 mm and 10.0 mm. Of course, other combinations of the above-noted ranges, as well as heights both greater than and less than those noted above, are also contemplated as the disclosure is not limited in this fashion.

It should be understood that a recoater assembly along with the corresponding recoater blade and powder entrainment system may be translated across a build surface using any appropriate translation direction, pattern, and/or velocity. For example, a recoater assembly may be translated across at least a portion of a build surface with a translational velocity parallel to the build surface that is greater than or equal to 5 mm/s, 10 mm/s, 20 mm/s, 50 mm/s, 100 mm/s, and/or any other appropriate velocity. Correspondingly, a velocity of the recoater assembly may be less than or equal to 200 mm/s, 150 mm/s, 100 mm/s, 50 mm/s, and/or any other appropriate velocity. Combinations of the foregoing ranges are contemplated including, for example, a velocity of the recoater assembly in a direction that is parallel to the underlying build surface that is between or equal to 5 mm/s and 200 mm/s, 25 mm sec and 100 mm/sec, and/or any other appropriate combination of the foregoing ranges. Of course, velocities both greater than and less than those noted above are also contemplated as the disclosure is not so limited.

Various types of powders may be used in an additive manufacturing system which may have a range of different types of characteristics depending on the desired application. Possible powders may include, but are not limited to, aluminum, titanium, steel, stainless steel, copper alloys, and/or any other appropriate type of material. Exemplary parameters of these powders are provided below. However, it should be understood that the disclosed methods and systems may be used with any appropriate type of powder as the disclosure is not limited to only the types of powders and powder characteristics described herein.

In some embodiments, a powder deposited onto a build surface of an additive manufacturing system may have an average particle size measured as the average maximum transverse dimension (e.g. average maximum diameter) of the powder. Accordingly, in some embodiments, an average maximum transverse dimension of the particles of a powder may be greater than or equal to 5 µm, 10 µm, 15 µm, 20 µm, 30 µm, 40 µm, 50 µm, and/or any other appropriate size. Correspondingly, the average maximum transverse dimension of the powder may be less than or equal to 100 µm, 90 µm, 80 µm, 70 µm, 60 µm, 50 µm, and/or any other appropriate size. Combinations of the foregoing ranges are contemplated including, for example, an average maximum transverse dimension of the particles of a powder that is between or equal to 5 µm and 100 µm, 15 µm and 50 µm, and/or any other appropriate combination of the foregoing ranges. Of course, powders with average sizes both greater than and less than those noted above are also contemplated as the disclosure is not so limited. Additionally, it should be understood that the average particle size (i.e. average maximum transverse dimension) may be measured using any appropriate particle size analysis method including, but not limited to, particle size analyzers using static light scattering, laser diffraction, staged sieving, and/or any other appropriate method as the disclosure is not so limited.

In some embodiments, a powder deposited onto a build surface of an additive manufacturing system may be made from a material with a desired density. Depending on whether a polymeric or metal powder is used, the particles of a powder may have a density that is greater than or equal to 1 g/cm$^3$, 2 g/cm$^3$, 2.6 g/cm$^3$, 3 g/cm$^3$, 4 g/cm$^3$, 5 g/cm$^3$, and/or any other appropriate density. Correspondingly, the density of the particles of a powder may be less than or equal to 9 g/cm$^3$, 8.9 g/cm$^3$, 8 g/cm$^3$, 7 g/cm$^3$, 6 g/cm$^3$, 5 g/cm$^3$, and/or any other appropriate density. Combinations of the foregoing ranges are contemplated including, for example, a density that is between or equal to 1 g/cm$^3$ and 9 g/m$^3$, 2.6 g/cm$^3$ and 8.9 g/cm$^3$, and/or any other appropriate combination of the foregoing ranges. Of course, powders with particles having densities both greater than and less than those noted above are also contemplated as the disclosure is not so limited. In some embodiments, the density of a powder may simply be known due to the material it is made from. Alternatively, appropriate methods of measuring the density of a powder may include water displacement density measurements of the powder, though it should be understood that the disclosure is not limited to how the density of a material is measured.

It should be understood that the additive manufacturing systems described herein may be operated using any appropriate type of fluid medium that a build surface might be exposed to. For example, for non-reactive materials that may be melted when exposed to oxygen (e.g. some polymers), the fluid may correspond to atmospheric air. Alternatively, the fluid may correspond to a relatively non-reactive gas such as helium, argon, krypton, xenon, radon, nitrogen, and/or any other appropriate gas depending on the intended application Additionally, an additive manufacturing system may be operated using a fluid having any appropriate pressure and/or density depending on the desired operating characteristics of the system. That said, in some instances, an additive manufacturing system may be operated using fluids with a pressure in a range between about 88 kPa and 102 kPa. However, embodiments in which different operating pressures are used including pressures both greater and less than those noted above are also contemplated.

Depending on the particular embodiment, a recoater blade and/or a portion of a powder entrainment system that forms a movable surface for generating a boundary layer of fluid may be made out of any suitable type of material including, for example, a metal, ceramic, plastic, and/or rubber. Accordingly, it should be understood that the various embodiments disclosed herein are not limited to the specific types of materials, or combinations materials, that the individual components are made from.

For the sake of clarity, the embodiments described relative to the figures illustrate powder entrainment systems that are moved together with a recoater blade such that the powder entrainment system is disposed behind and moves with the recoater blade in a direction of travel of the recoater blade over a build surface. However, it should be understood that a powder entrainment system may also be mounted to a secondary motion mechanism that moves separately from the portion of the recoater assembly that the recoater blade is attached to. Thus, in some embodiments, a powder entrainment system may be moved separately from the recoater blade in any desired direction as the disclosure is not limited in this fashion. Additionally, a powder entrainment system may either make a single pass over a recoated build surface, or it can be passed over the recoated surface multiple times as the disclosure is not limited to the number of times that a powder entrainment system is passed over a build surface and/or the pattern in which it is traversed across the build surface.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-1E show one embodiment of a prior art system that may experience negative feedback during the deposition and fusion of subsequent layers of powder 8 on a build surface 4 leading to the growth of a defect. Specifically, as shown in the figures, a printed layer may produce a defect 6 corresponding to a high spot where the fused material extends upwards above the surrounding portions of the fused layers forming the build surface that each subsequent powder layer is deposited onto. This high spot can be caused by thermal stress and deformation that has accumulated over several previous layers, or may be caused by other issues such as clumping of previous powder layers or welding spatter from previous fused areas. If the defect is taller, i.e. extends above the nominal height, of the next layer, a recoater blade 2 of the system may contact the defect during translation of the recoater blade across the build surface. This interference contact between the recoater blade and the defect during recoater motion may cause the recoater blade to deform or deflect upward around the defect. This may result in more powder 8 being deposited over the contact point. If the next printed layer processes (i.e. melts) the powder over the previous high spot, this may result in a defect that extends even further above that printed layer than the previous defect did over the corresponding printed layer. As subsequent layers are deposited and fused, this process may continue to repeat leading to larger defects and increased interference with the recoater blade. Ultimately, this process may continue either until the recoater blade is damaged beyond use, the previously printed layers are damaged and deformed to a failure point, and/or until the recoating process fails because the recoater mechanism jams at the interference point between the defect and recoater blade.

Figure 2A:
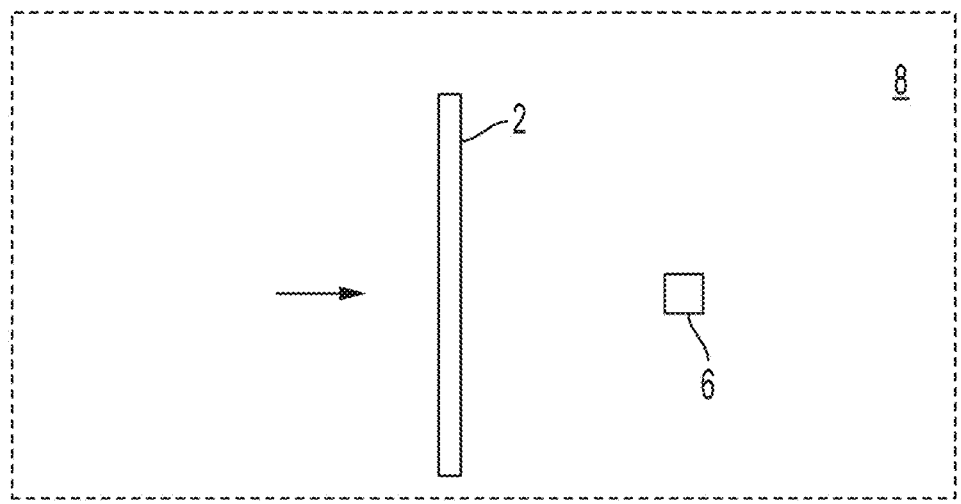
FIG. 2A is a schematic top view of a recoater blade moving towards a defect present on a build surface during deposition of a powder layer.
Figure 2B:
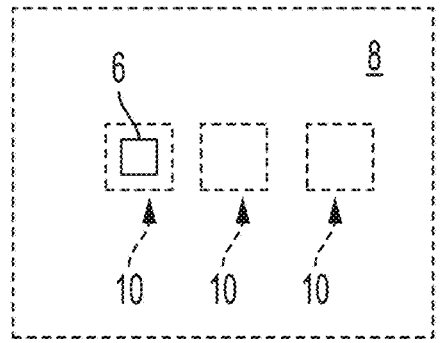
FIGS. 2B-2D are schematic top views of powder disturbances formed due to contact of the recoater blade with the defect located on the build surface.
Figure 2C:
Figure 2D:
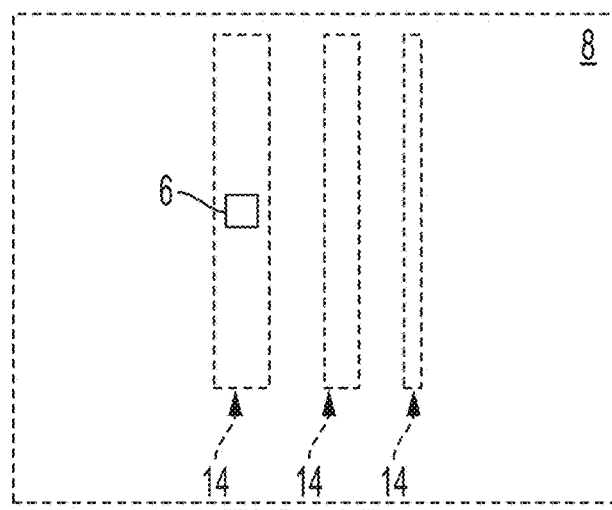

In addition to the specific contact interference between a defect and the recoater blade during powder deposition, the above-noted negative feedback can also propagate from the initial interference contact point to other portions of a build surface. Examples of different types of disturbances that may be formed in a powder layer deposited onto a build surface related to this contact interference is shown in FIGS. 2A-2D. FIG. 2A shows a top view of a recoater blade 2 translating towards a defect 6 located on a build surface on which a powder layer 8 has been deposited. The defect is of an appropriate size such that contact between the recoater blade and the defect may occur during translation of the recoater blade. The interference between the recoater blade and the defect may cause excessive powder thickness around the contact point as well as in pockets 10 after the contact point if vertical vibrations are induced in the recoater assembly as a result of the interference contact, see FIG. 2B. Alternatively, the contact may cause enough damage to the recoater blade such that a nick or chip is formed in the recoater blade leading to the recoater blade forming a track 12 after the contact point where an increased amount of powder is deposited along the track relative to the surrounding portions of the build surface, see FIG. 2C. FIG. 2D shows how disturbances in the deposited powder layer may also occur across the width of the build plane as the contact between the recoater blade and one or more defects 6 may cause a vertical lifting of the entire recoater assembly. Subsequent vertical vibrations of the recoater blade may cause follow on tracks 12 that extend in a direction parallel to the recoater blade at a location on the build surface that is located after the defect relative to a direction of travel of the recoater blade. Combinations of interference patterns from FIGS. 2B-2D may also be produced though it should be understood that potential defects and patterns formed in the deposited powder layer other than those described in the figures are also possible.

Figure 3:
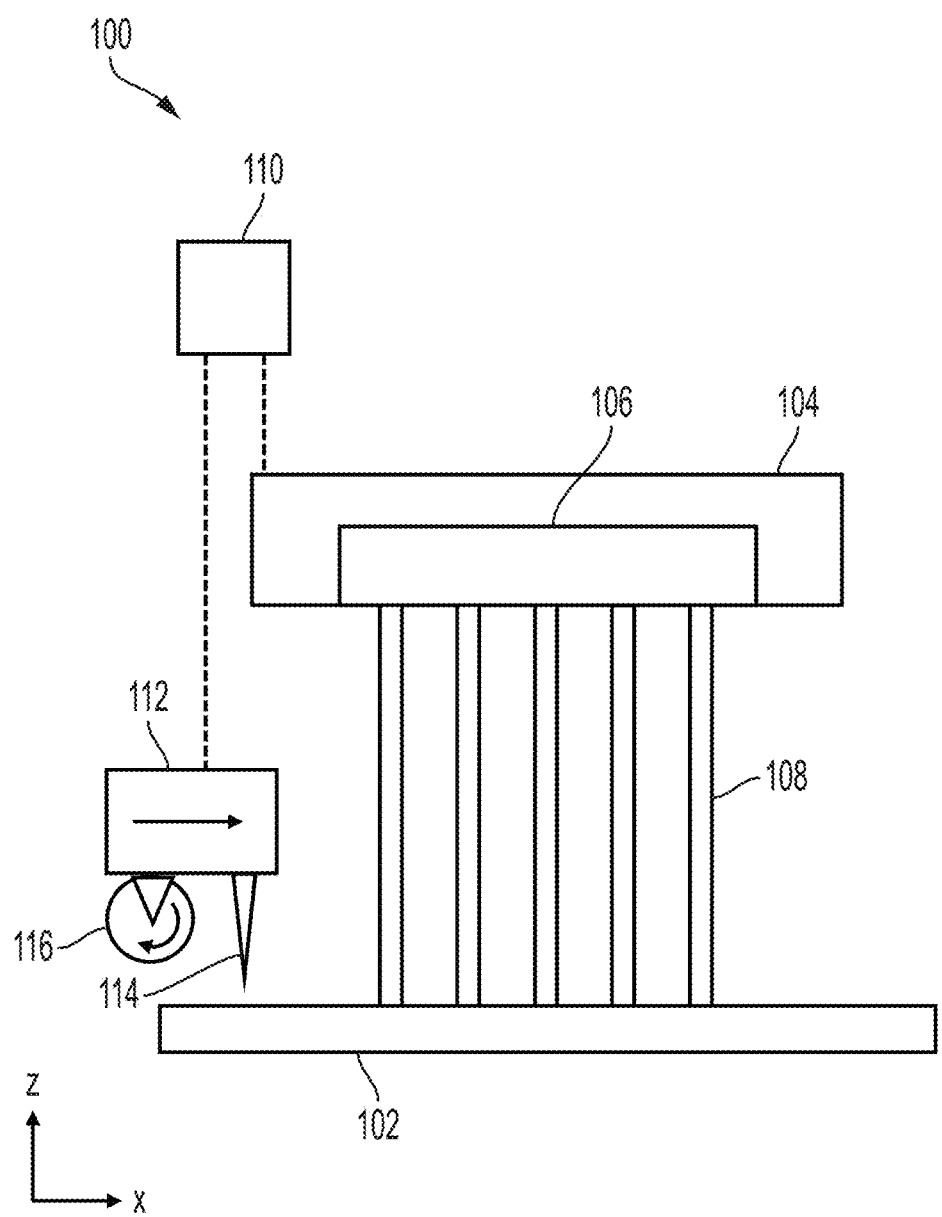
FIG. 3 is a schematic side view of an additive manufacturing system according to one embodiment.

FIG. 3 depicts one embodiment of an additive manufacturing system 100. The additive manufacturing system 100 may include a build surface 102 and a laser assembly 104. Depending on whether or not the manufacturing of a part has already commenced, the build surface 102 may include a build plate, a portion of a printed part, a subsequently deposited and processed layer, and/or any other surface upon which a part or a portion of a part may be additively manufactured. The laser assembly 104 may include an optics assembly 106 configured to emit one or more laser beams 108 towards the build surface to melt powder disposed on the build surface in a desired pattern. Depending on the particular embodiment, the optics assembly may be movable relative to the build surface, though embodiments in which the lasers are scanned across the build surface using galvano mirrors or other appropriate optical steering mechanisms are also contemplated. The additive manufacturing system may also include a recoater assembly 112 which may include a recoater blade 114 and a powder entrainment system 116. As described previously, the recoater assembly may be translated in a direction across at least a portion of a build surface during a powder recoating process. As elaborated on below, the powder entrainment system may follow behind a path of travel of the recoater blade though embodiments in which the powder entrainment system is translated across the build surface separately from the recoater blade are also contemplated.

In the depicted embodiment, the powder entrainment system 116 includes a spinning rod disposed behind a path of travel of the recoater blade 114. The rod has an axis of rotation that is substantially parallel to the underlying build surface 102 such that the spinning motion of the rod induces a boundary flow around the rod where at least a portion of the boundary flow is disposed between the rod, or other movable surface of a powder entrainment system, and the build surface. By changing the rotational velocity, the radius of the rod, and the height of the rotating rod above the new powder level, the shape and magnitude of the boundary layer relative to the underlying layer of powder can be controlled to disperse and/or remove powder located at a height greater than a threshold height above the build surface which may correspond to a previously deposited and processed layer and/or an underlying build plate.

In some embodiments, an additive manufacturing system may additionally include a processor 110 which may include an associated memory configured to store processor-executable instructions to perform the methods described herein. The processor 110 may be operatively coupled to the laser assembly 104, the recoater assembly 112 and any components therein, including but not limited to the optics assembly 110, the powder entrainment system, and/or any other appropriate component of the additive manufacturing system. Accordingly, the processor may operate any desired components of the additive manufacturing system to perform the methods described herein.

Figure 4:
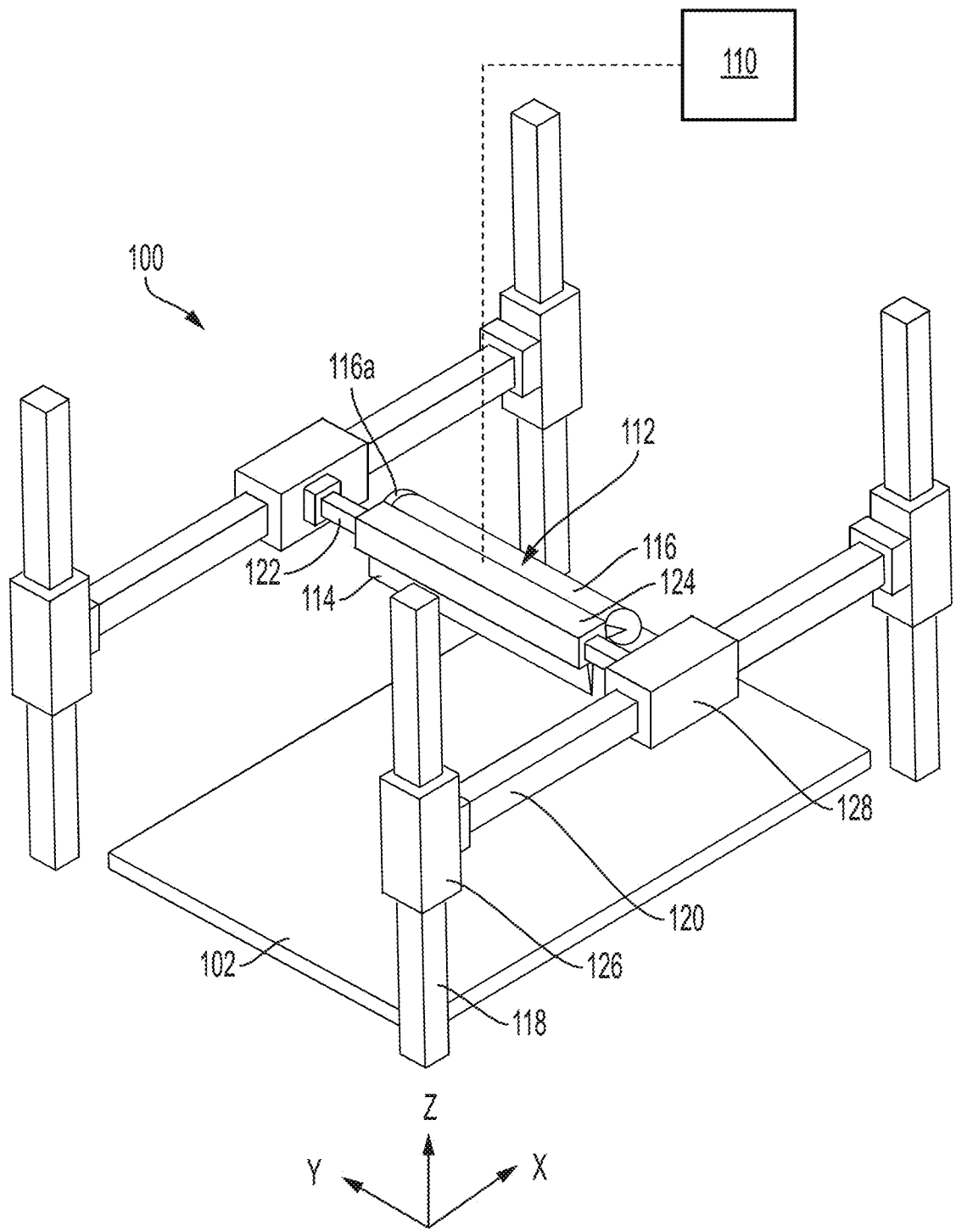
FIG. 4 is a schematic perspective view of an additive manufacturing system according to one embodiment.

FIG. 4 is a schematic representation of an additive manufacturing system 100, according to some embodiments. In the depicted embodiment, the additive manufacturing system 100 includes a build surface 102, four support columns 118, two support rails 120, a recoater assembly 112. The recoater assembly may include a recoater support 122, a recoater blade housing 124, a recoater blade 114, and a powder entrainment system 116 as well as a build surface 120. The four support columns and two support rails support the recoater assembly at a desired height and orientation above the build surface. The two support rails 104 may be connected to the four support columns 102. In particular, each of the two support rails is connected to two of the four support columns 102 in a direction that is parallel to the depicted X axis. In some embodiments, the support rails 104 are coupled to the support columns 102 via translational attachments 126. Thus, the translational attachments may allow ends of each support rail to translate vertically (i.e., in a direction parallel to the Z axis) along the support columns 102 to allow a height of the support rails and the associated recoater assembly to be controlled using any appropriate arrangement of actuators, not depicted.

As noted above, the recoater assembly 112 includes a recoater support 122, a recoater blade housing 124, a recoater blade 114, and a powder entrainment system 116. The recoater blade housing may be configured to securely hold the recoater blade, and may be mounted to the recoater support. Similarly, in some embodiments, a powder entrainment system 116 may be mounted to the recoater blade housing, or other appropriate portion of the recoater assembly, such that the powder entrainment system may be translated with the recoater assembly across the build surface 102. In the depicted embodiment, the powder entrainment system corresponds to a rotatable cylinder with an axis of rotation that it is oriented in a direction that is parallel to the underlying build surface. The rotatable cylinder, or other moveable surface of a powder entrainment system, may be driven using any appropriate actuator 116a configured to drive the moveable surface in a desired direction. The recoater support may be coupled to the support rails 120. In the depicted embodiment, the recoater support extends between the support rails along an axis parallel to the Y axis and perpendicular to the X axis. In particular, the recoater support is coupled to the support rails via recoater translational attachments 128 disposed at either end of the recoater support. This may allow the recoater support, and thus, the overall recoater assembly to translate horizontally across the build surface in a direction that is parallel to the build surface and the X axis along the support rails 104 using any appropriate type of associated actuator, not depicted.

Depending on the particular embodiment, a distance between a recoater and a build surface may be measured and/or controlled via any suitable types of measurement or control systems. For example, vertical motion of a recoater assembly (e.g., along support columns 118) may be driven by actuators such as ball screw driven stages, linear motor stages, linear actuators, pneumatic actuators, hydraulic actuators, and so on. Moreover, the position of such vertical motion stages may be tracked and/or measured via systems such as rotary encoders on ball screws, linear optical encoders, LVDT sensors, laser displacement sensors, and so on. For example, in one embodiment, a vertical motion stage may be driven by a ball screw driven linear actuator, and the position of the motion stage may be tracked via linear optical encoders. Of course, it should be appreciated that the current disclosure is not limited to any particular combination of types of vertical motion stages and/or systems for tracking or measuring the position of the motion vertical motion stages. Similarly, the systems disclosed herein may include any suitable types of motion stages for accommodating movement of the recoater assembly along the support rails. For example, the recoater assembly may be driven along the support rails via ball screw driven linear slides, belt driven linear actuators, pneumatic actuators, hydraulic actuators, and so on, and the position of the recoater assembly may be monitored via one or more of rotary encoders, linear optical encoders, LVDT sensors, laser displacement sensors, and so on.

As discussed previously, in some embodiments, an additive manufacturing system 100 may include a processor 110 that is operatively coupled to the recoater assembly to control operation of powder dispensing, vertical and/or horizontal translation of the recoater assembly 112, and/or operation of the powder entrainment system 116. For example, the processor may be operatively coupled to one or more actuators associated with one or more of the attachments 126 and/or 128, and the processor may control operation of each actuator to control a height of the recoater assembly relative to the build surface and/or motion of the recoater assembly across at least a portion of the build surface. Additionally, the processor may be operatively coupled to the powder entrainment system and may be configured to control operation of the powder entrainment system using any of the methods disclosed herein to mitigate the formation of defects extending above a nominal height of a powder layer disposed on the build surface 102.

Figure 5:
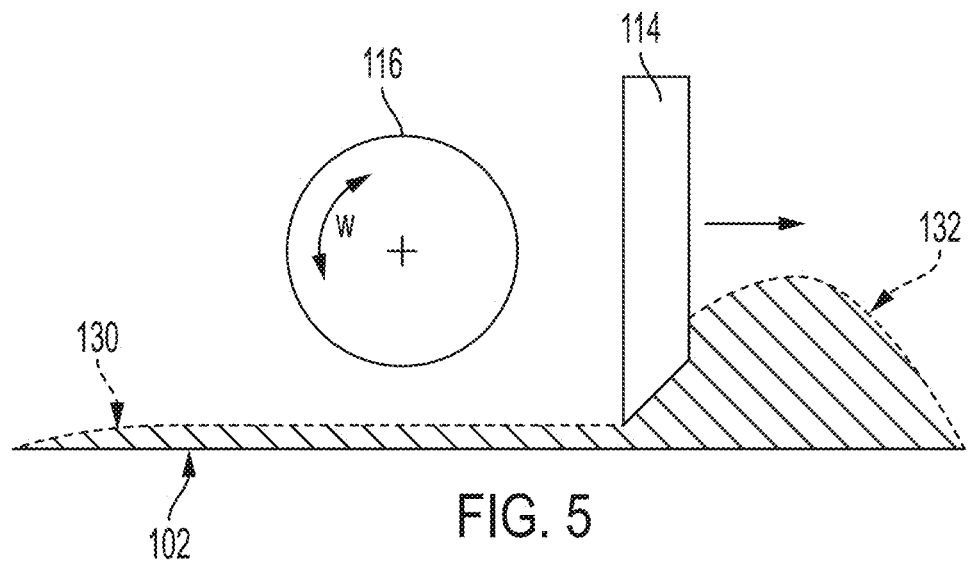
FIG. 5 is a schematic side view of one embodiment of a recoater assembly including a powder entrainment system during a recoating process.
Figure 6:
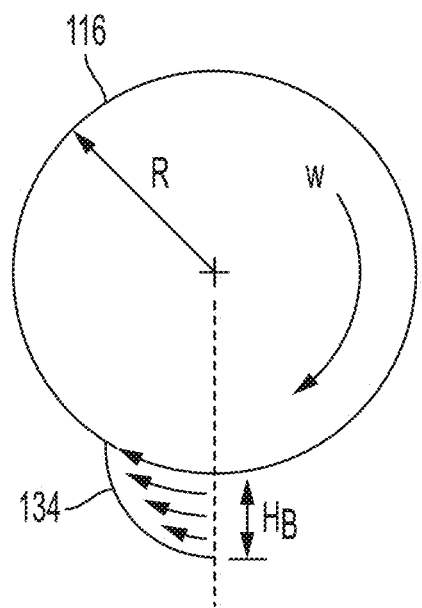
FIG. 6 is a schematic side view of a rotating cylinder and the associated velocity profile of the attached boundary layer of fluid.

FIG. 5 depicts a schematic embodiment of a powder layer 130 deposited onto a build surface 102. The recoater blade of the recoater assembly is dragged across the surface of the build plate leaving a desired thickness of the powder layer behind a path of travel of the recoater blade. Correspondingly, a pile of powder 132 may build up on a front surface of the recoater blade relative to the direction of travel as the recoater blade is dragged across the build surface. The recoater system may also include a powder entrainment system 116 in the form of a rotatable cylinder, or other appropriate moveable surface that may be moved relative to the underlying build surface to induce a boundary flow adhered to the movable surface that may provide a flow of fluid between the movable surface and the build surface. For example, the rotatable cylinder may be rotated relative to the build surface with a rotational velocity "w" in either direction. Depending on the radius of the cylinder and the rotational speed of the cylinder, a boundary flow may be induced on the cylinder with any desired boundary layer height $H_B$ and velocity profile 134, see FIG. 6. This boundary layer of fluid adhered to the surface of the rotating cylinder, or other movable surface of a powder entrainment system, may result in a flow of fluid between the build surface and a surface of the cylinder, or other movable surface of a powder entrainment system, oriented towards the build surface. Further, since the rotating rod may be located at a height well above the nominal new powder layer thickness, even defects from a previous print layer that may contact the recoater blade may still be well below the solid surface of the rotating rod so no contact between the defect and the rod may occur. Accordingly, as elaborated on below, this method may help to remove and/or disperse at least a portion, a majority, and in some instances substantially all of the excess powder deposited at a location of a defect which may help to limit the maximum height of excess powder deposited in a location which may reduce the risk of a negative feedback loop causing print problems during an additive manufacturing process.

Figure 7:
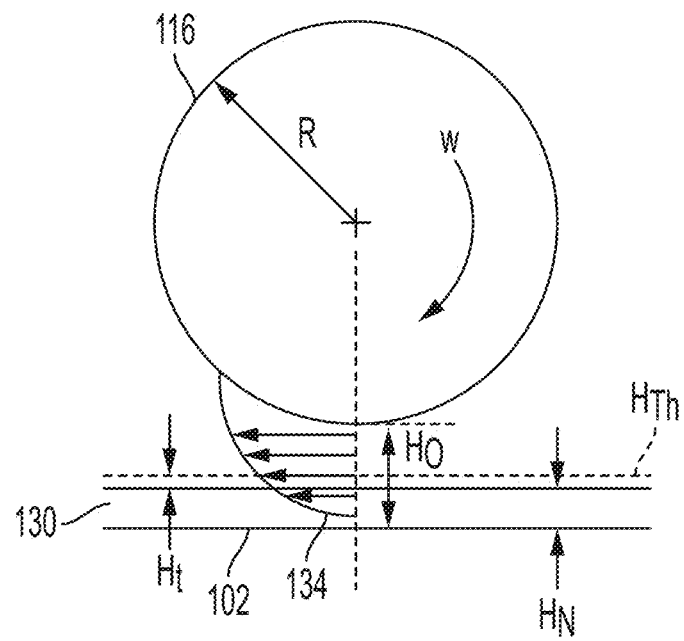
FIG. 7 is a schematic side view of one embodiment of a rotating cylinder used to entrain powder above a threshold height from an associated build surface.

As shown in FIG. 7, a rotatable cylinder forming a portion of a powder entrainment system 116 may be used to disperse and/or remove any excess powder of a powder layer 130 that extends far enough into the boundary layer around the spinning rod. Specifically, the velocity profile 134 of the boundary flow may increase in velocity from the build surface 102 towards the movable surface of the cylinder or other appropriate moveable surface oriented towards the build surface used to induce the flow of fluid. In the figure, a powder layer 130 has been deposited onto the build surface with a nominal layer height of $H_N$ and a permitted layer height tolerance $H_t$ that the powder layer may extend above the nominal layer height. Correspondingly, a threshold height above the build surface above which the powder may be dispersed and/or removed may correspond to $H_{th}$ which is the combined total of the nominal layer height and layer height tolerance. Correspondingly, an outer surface of the rotating cylinder oriented towards the build surface may be offset from the build surface by an offset height Ho. By selecting an appropriate combination of the cylinder size and rotational velocity, the velocity profile of the boundary flow may have a velocity that is equal to or greater than a minimum entrainment velocity of the powder of the powder layer at heights above the build surface that are greater than or equal to the threshold height. Accordingly, any excess powder that extends to a height greater than the threshold height relative to the build surface may either be removed and/or distributed over a much larger area due to the powder located at or above the threshold height being entrained in the flow of fluid while leaving the powder below the threshold height in the powder layer in a substantially undisturbed state.

Figure 8:
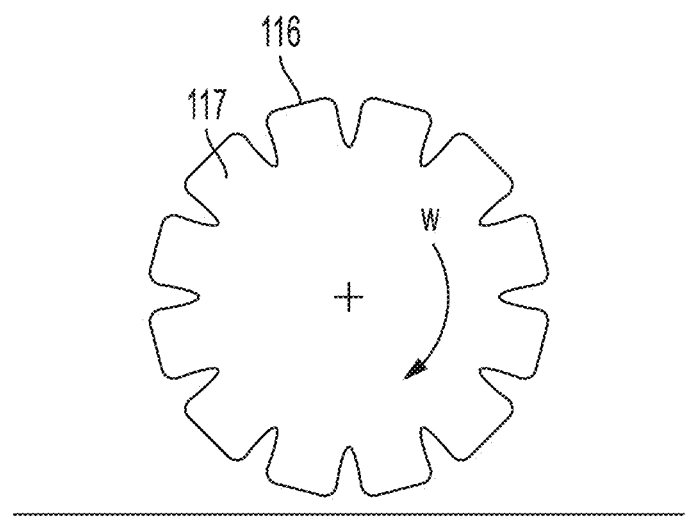
FIG. 8 is a schematic side view of one embodiment of a rotating cylinder including surface features formed on the cylinder.

In some embodiments, it may be desirable to either increase the turbulence within a boundary flow adhered to a movable surface of a powder entrainment system and/or to provide pulsatile flow. Accordingly, while a solid smooth surface such as a solid rotating rod is depicted in other embodiments as illustrated in FIG. 8, in some embodiments a movable surface of a powder entrainment system 116 used to induce a boundary flow may include a plurality of surface features disposed thereon. For example, in the depicted embodiment of a rotating cylinder, the rotating cylinder may include a plurality of surface features 117 with varying heights disposed on the surface. Specifically, surface features such as fins, protrusions, bumps, divots, dimples, channels, and/or any other appropriate surface future may be provided on a movable surface to provide a desired pattern of flow. While such a feature may be optional, these types of surface features may entrain more flow and/or add pressure variations (i.e. flow pulses) to the entrained flow which may aid in randomly dispersing excess powder on a build surface of a system and/or increasing the size of an induced boundary layer of fluid attached to the movable surface.

Figure 10:
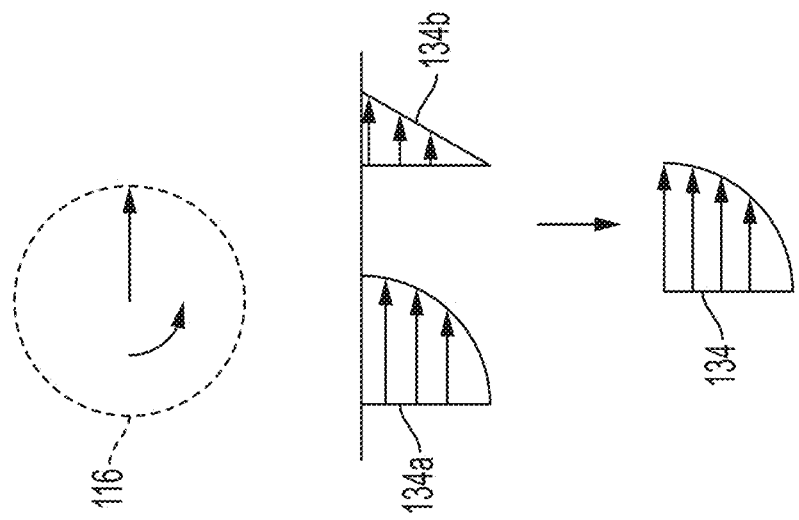
FIG. 10 is a schematic diagram of the net velocity profile of a boundary layer when a portion of a movable surface moves in the same direction as a direction of motion of the overall assembly.
Figure 9:
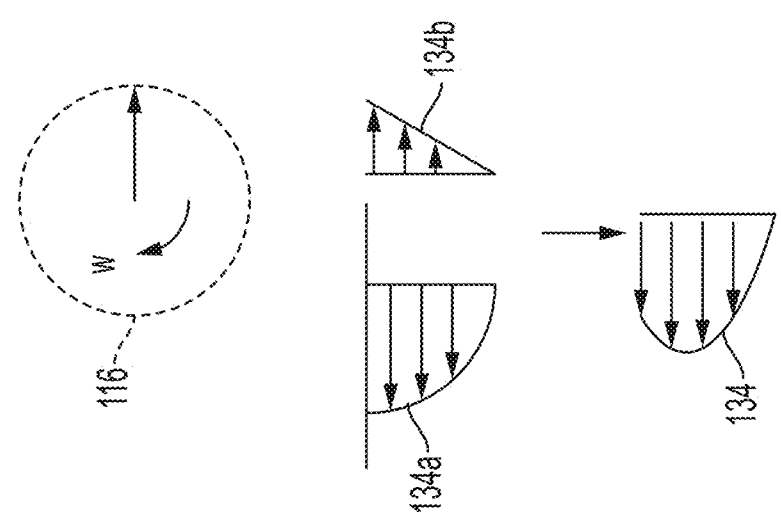
FIG. 9 is a schematic diagram of the net velocity profile of a boundary layer when a portion of a movable surface moves in a direction opposite a direction of motion of the overall assembly.

Depending on whether or not a movable surface used to induce a boundary flow between a powder entrainment system 116 and a build surface moves in a direction that is the same or opposite from a direction of travel of the overall powder entrainment system, the resulting velocity profile 134 of the boundary layer may have a different shape. Specifically, as shown in FIG. 9 having a moving surface that moves in a direction opposite the direction of travel of the overall powder entrainment system results in a boundary flow with a velocity profile that initially increases in velocity in a direction oriented towards the movable surface prior to decreasing in velocity. Without wishing to be bound by theory, this is due to the first velocity profile 134a from rotation of the rod and the second velocity profile 134b from translation of the powder entrainment system over the build surface at least partially canceling each other out. Correspondingly, when the movable surface of the powder entrainment system moves in the same direction as the direction of movement of the overall powder entrainment system, the velocity profiles are constructive such that the overall velocity profile 134 increases continuously in a direction oriented towards the movable surface of the depicted rotating cylinder, see FIG. 10. However, in general the translational speed of the powder entrainment system may be significantly slower than the relative velocity of the movable surface relative to the underlying build surface such that the relative directions of the overall translation of the system and direction of movement of the movable surface relative to the overall system may have little effect on the net boundary layer velocity profile shape.

Figure 11:
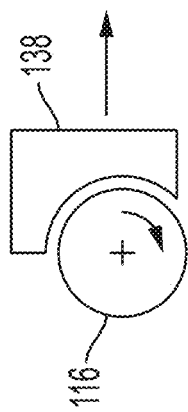
FIG. 11 is a schematic cross-sectional view of a rotating cylinder with a mask disposed on the leading portion of the cylinder.
Figure 13:
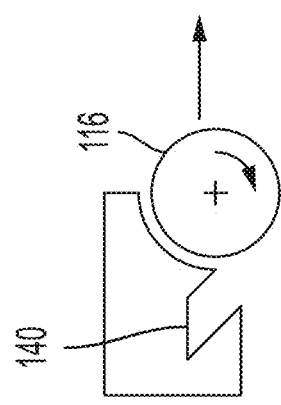
FIG. 13 is a schematic cross-sectional view of a rotating cylinder with a mask on a trailing portion of the rotating cylinder and a vacuum port.
Figure 12:
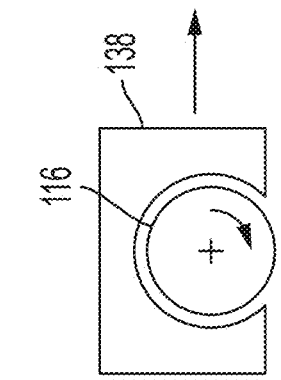
FIG. 12 is a schematic cross-sectional view of a rotating cylinder with a mask disposed on both a leading and trailing portion of the rotating cylinder.

In some instances, it may be desirable to strip a portion of a boundary layer and the entrained powder from a movable surface to help disperse and/or remove the entrained powder. For example, as shown in FIG. 11, a mask 138 may be positioned adjacent to the movable surface of a powder entrainment system 116 such as the depicted rotating cylinder. The mask may correspond to a structure that is contoured to at least a portion of the movable surface and may be disposed adjacent to the movable surface at a distance that is less than a thickness of the induced boundary flow attached to the movable surface. Accordingly, the mask may cause at least a portion of the boundary flow to be detached from the movable surface. While the mask has been depicted as being positioned on a leading edge of the rotatable cylinder relative to the indicated direction of motion, embodiments in which the mask is disposed on both a leading and/or trailing portions of a movable surface of a powder entrainment system are also contemplated, see FIGS. 12 and 13. In either case, the mask may serve to strip the boundary layer flow from the movable surface at a location close to entrainment point to either create a new fresh boundary layer close to the entrainment point or to strip the majority of the entrained flow after the entrainment point. In some embodiments, the mask, or other portion of the powder entrainment system or recoater assembly, may also be fitted with a vacuum port 140 connected to an appropriate vacuum source, not depicted. In the depicted embodiment, the vacuum port is oriented towards a location where the mask strips the boundary layer off of the movable surface though other arrangements are also contemplated. The use of a vacuum port may help to capture and remove at least a portion of the entrained powder which may reduce the quantity of a powder that is redeposited onto the build surface.

While a rotatable cylinder has been depicted in the above embodiments, it should be understood that a rotatable cylinder is only one way of implementing a movable surface to induce a flow of fluid over the build surface of an additive manufacturing system. Other exemplary types of systems that may function as the movable surface of a powder entrainment system are elaborated on below. Accordingly, it should be understood that the current disclosure is not limited to any specific construction to induce a flow of fluid between a recoater assembly and a build surface to entrain powder particles located above a threshold height relative to the underlying build surface.

FIGS. 14-16 depict another embodiment of a recoater assembly 112 with a powder entrainment system 116. In the depicted embodiment, the recoater assembly includes a recoater blade 114 that traverses a build surface, not depicted, in a desired direction. The powder entrainment system 116 includes a plurality of rotatable disks 142 that are arranged in an array that extends along at least a portion of a length, and in some instances substantially all of the length, of the recoater blade. Each of the rotatable disks includes an axis of rotation that extends in a direction that is angled relative to the underlying build surface, such as in a direction that is perpendicular to the build surface. Accordingly, a bottom surface of each of the rotatable disks may be substantially parallel to the underlying build surface. By driving each of the disks to rotate about their rotational axes using one or more appropriate actuators, not depicted, the bottom surface of the disks oriented towards the build surface will rotate relative to the build surface which may induce a boundary flow of fluid between the rotating disks surfaces and the build surface in a manner similar to that described above though the relative speed of the boundary layer will be greatest at the outer most edge of the disks due to the translational speed of each point on the surfaces increasing with increasing radius. Accordingly, the induced flow between the disk and nominal powder layer can be used in order to entrain powders deposited at heights greater than a threshold height from a build surface in a manner similar to that noted above. Depending on the particular design, the disks can be arranged in straight arrays including one or more aligned rows of disks with minimal gaps between disks, see FIG. 15. Alternatively, the disks may be set in staggered arrays where separate rows of the disks may be offset from one another such that the disks in one row may overlap with gaps in an adjacent row which may result in every point in the powder layer being subject to at least two different flow conditions on each pass of the powder entrainment system, see FIG. 16.

FIGS. 17-18 depict yet another embodiment of recoater assembly 112 including a powder entrainment system 116 with a movable surface that may be used to induce a boundary flow of fluid between a build surface 102 and a portion of a movable surface oriented towards the build surface. In this embodiment, the movable surface corresponds to a belt 144 that includes at least a portion that is positioned proximate to and/or oriented towards the build surface within an appropriate offset distance from the build surface as previously discussed. Similar to the above embodiments, the belt is located behind the recoater blade 114 relative to a path of travel of the recoater blade across the build surface. The belt may be associated with two or more rollers 146 which are arranged to guide the belt through a desired path of travel. The rollers may either be the same size and/or different sizes depending on the desired application. At least one of the rollers may be a drive roller with an associated actuator, not depicted, that is used to drive the belt in a desired direction relative to the underlying build surface. In the embodiment shown in FIG. 17 two rollers are positioned proximate to the build surface such that a portion of the belt extends in a direction substantially parallel to the underlying build surface for a predetermined length. Such an embodiment may be advantageous in that the boundary flow adhered to the moving belt may be applied over a broad area of the build surface. Alternatively, a single roller may be located proximate to the build surface such that the belt moves over a region of the build surface as it moves over the roller proximate to the build surface, see FIG. 18. This may cause the boundary flow attached to the belt to be applied over a smaller area corresponding to the portion of the roller oriented towards the build surface. Depending on the overall radius of the roller and corresponding thickness of the boundary layer, this may cause the boundary flow to apply flows of fluid with velocities above the minimum entrainment velocity of the powder over a relatively small portion of the build surface. As also depicted in the embodiment of FIG. 18, in some instances a vacuum port and/or mask, such as the combined mask and vacuum port 138/140 may be positioned proximate to a portion of the belt downstream from a location where the belt moves over the build surface relative to a direction of flow across the build surface. As discussed above, this may help to strip off and/or remove the boundary flow and entrained powder from the moving belt.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a processor readable storage medium (or multiple computer readable media) (e.g., a computer memory, one or more floppy disks, compact disks (CD), optical disks, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more processors, perform methods that implement the various embodiments discussed above. As is apparent from the foregoing examples, a processor readable storage medium may retain information for a sufficient time to provide computer-executable instructions in a non-transitory form. Such a processor readable storage medium or media can be transportable, such that the program or programs stored thereon can be loaded onto one or more different computing devices or other processors to implement various aspects of the present disclosure as discussed above. As used herein, the term "processor-readable storage medium" encompasses only a non-transitory processor-readable medium that can be considered to be a manufacture (i.e., article of manufacture) or a machine. Alternatively or additionally, the disclosure may be embodied as a processor readable medium other than a processor-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Processor-executable instructions may be in many forms, such as program modules, executed by one or more processors. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A recoater assembly for an additive manufacturing system, the recoater assembly comprising:
   a recoater blade; and
   a powder entrainment system configured to generate a flow of fluid across a portion of a build surface with a velocity profile that increases from the build surface towards the powder entrainment system.

2. The recoater assembly of claim 1, wherein the powder entrainment system is configured to trail behind the recoater blade relative to a direction of travel of the recoater blade across the build surface, and wherein the powder entrainment system is configured to generate the flow of fluid behind the recoater blade relative to the direction of travel.

3. The recoater assembly of claim 1, wherein a velocity of at least a portion of the flow of fluid is between or equal to 0.1 meters per second (m/s) and 2.0 m/s at a height from the build surface that is between or equal to 0.5 millimeters (mm) and 10.0 mm.

4. The recoater assembly of claim 1, wherein the powder entrainment system includes a movable surface that generates the flow of fluid with a boundary layer of the fluid adhered to the movable surface.

5. The recoater assembly of claim 4, wherein a portion of the movable surface oriented towards the build surface is configured to move in a direction of motion of the recoater blade.

6. The recoater assembly of claim 4, wherein a portion of the movable surface oriented towards the build surface is configured to move in a direction that is opposite a direction of motion of the recoater blade.

7. The recoater assembly of claim 4, further comprising a plurality of surface features with varying heights disposed on the movable surface.

8. The recoater assembly of claim 4, further comprising a mask configured to disrupt the boundary layer of the fluid adhered to the movable surface.

9. The recoater assembly of claim 1, wherein the powder entrainment system includes a rotatable roller, and wherein an axis of rotation of the rotatable roller is parallel to the build surface.

10. The recoater assembly of claim 1, wherein the powder entrainment system includes a belt, and wherein at least a portion of the belt is configured to move parallel to the build surface.

11. The recoater assembly of claim 1, wherein the powder entrainment system includes a plurality of rotatable disks.

12. The recoater assembly of claim 11, wherein the plurality of rotatable disks are arranged in an array.

13. The recoater assembly of claim 1, further comprising a vacuum configured to remove powder entrained in the fluid.

14. A recoater assembly for an additive manufacturing system, the recoater assembly comprising:
a recoater blade; and
a powder entrainment system configured to trail behind the recoater blade relative to a direction of motion of the recoater blade across a build surface of the additive manufacturing system, and wherein the powder entrainment system includes a movable surface that is configured to move relative to a proximate portion of the build surface at a first velocity that is different from a second velocity of the recoater blade relative to the build surface, and wherein the first velocity is between or equal to 0.1 meters per second (m/s) and 2.0 m/s, and wherein at least a portion of the movable surface is disposed at a height from the build surface that is between or equal to 0.5 millimeters (mm) and 10.0 mm.

15. The recoater assembly of claim 14, wherein a portion of the movable surface oriented towards the build surface is configured to move in the direction of motion of the recoater blade.

16. The recoater assembly of claim 14, wherein a portion of the movable surface oriented towards the build surface is configured to move in a direction that is opposite the direction of motion of the recoater blade.

17. The recoater assembly of claim 14, further comprising a plurality of surface features with varying heights disposed on the movable surface.

18. The recoater assembly of claim 14, further comprising a mask configured to disrupt a boundary layer of a fluid adhered to the movable surface.

19. The recoater assembly of claim 14, wherein the movable surface comprises a rotatable roller, wherein an axis of rotation of the rotatable roller is parallel to the build surface.

20. The recoater assembly of claim 14, wherein the movable surface comprises a belt, and wherein at least a portion of the belt is configured to move parallel to the build surface.

21. The recoater assembly of claim 14, wherein the movable surface comprises a plurality of rotatable disks.

22. The recoater assembly of claim 21, wherein the plurality of rotatable disks are arranged in an array.

23. The recoater assembly of claim 14, further comprising a vacuum configured to remove powder entrained in a flow of fluid generated by the movable surface.

* * * * *